United States Patent Office 2,755,787
Patented July 24, 1956

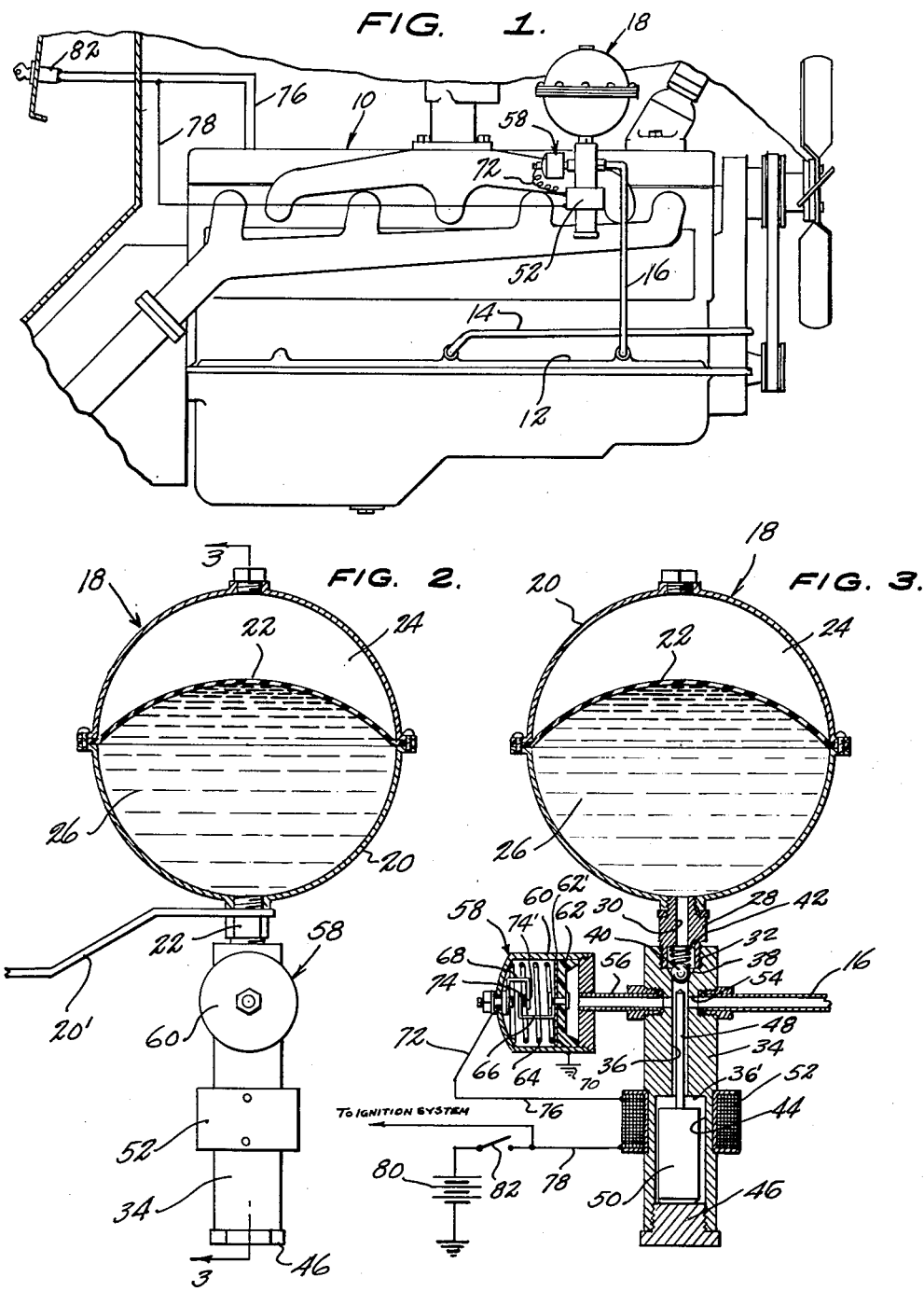

2,755,787

PRELIMINARY LUBRICATING MEANS FOR AN ENGINE

Walter E. Butler and Raymond B. Butler, North Sacramento, Calif.

Application January 22, 1954, Serial No. 405,638

2 Claims. (Cl. 123—196)

This invention relates to a preliminary lubricating means for an engine of the automotive type and has for its primary object to supply lubricant under pressure to the working parts of the engine as soon as the ignition switch is turned to "on" position so as to assure adequate lubrication of the engine.

Another object is to arrest the operation of the preliminary lubricating means when the pressure in the lubricating system attains normalcy.

The above and other objects may be attained by employing this invention which embodies among its features a resiliently extensible oil storage vessel, a check valve carried by the oil storage vessel and connected to the interior thereof and to the lubricating system of a conventional type having a force feed lubricating system for preventing the flow of lubricant from said vessel into the lubricating system while permitting the flow of lubricant under pressure into the vessel, electrically energizable means operatively connected to the check valve for opening it when energized, said electrical energizable means being connected to the ignition system for energization thereby when the system is energized, and pressure responsive means operatively connected to the lubrication system and to the ignition system and operable when the pressure in the lubricating system exceeds a predetermined value to deenergize the electrical energizable means and allow the check valve to close.

In the drawings:

Figure 1 is a side view of a conventional automotive engine showing this preliminary lubricating means mounted thereon and connected to the ignition system of the engine;

Figure 2 is an enlarged side view partially in section of the preliminary lubricating means; and Figure 3 is a vertical sectional view taken substantially on the line 3—3 of Figure 2.

Referring to the drawings in detail, an engine 10 is equipped with a conventional force feed lubricating system which includes a pressure pipe 12 and a return pipe 14. Connected to the pressure pipe and extending upwardly therefrom beside the engine is a conduit 16 on the upper end of which is mounted the preliminary lubricating means designated generally 18. A suitable bracket 20' provides a support for the lubricating means 18, as will be readily understood upon reference to Figure 2.

The lubricating means 18 comprises an accumulator 20 of the conventional type having an expansible partition wall 22 therein separating the accumulator body into separate compartments 24 and 26, the compartment 26 serving as a lubricant reservoir. Fittedly connected to the accumulator body and communicating with the interior of the reservoir 26 is a nipple 28 which is provided with an axial passage 30 and a depending externally screw threaded cage 32. Threadedly coupled to the cage 32 is a valve body 34 having a longitudinal bore 36 extending therethrough and carrying adjacent the upper end thereof a valve seat 38 which forms one end of the cage 32 and serves to arrest downward motion of a ball valve 40 which is adapted to move within the cage against the effort of a compression coil spring 42 when unseated from the valve seat 38. The lower end of the axial passage 36 opens into an elongated recess 44 which opens outwardly through the lower end of the body 34 and is closed adjacent its lower end by a conventional screw plug 46. An armature 50 is positioned in the recess 44 and is movable within said recess from the depressed position shown in Figure 3 to an elevated position in which it engages the shoulder 36' at the merger point of the recess 44 with the bore 36. The armature 50 carries a stem 48 which has an upper end arranged to engage and open the check valve 40 in the elevated position of the armature 50 and to be disengaged from the check valve 40 in the depressed position of the armature 50. Extending transversely through the valve body between the recess 44 and the valve seat 38 is a passage 54 which communicates with the bore 36, as will be readily understood upon reference to Figure 3. Coupled in any conventionad manner with the passage 54 on one side of the valve body 34 is the pressure pipe 16, while the opposite side of the valve body 34 is connected through the medium of a conduit 56 with a pressure-actuated switch designated generally 58.

The switch 58, above referred to, comprises a conductive cylinder 60 in which a piston 62 is mounted to slide toward and away from the open end of the pipe 56 so that as pressure is built up in the valve body by the flow of lubricant through the duct 16, the piston 62 will be moved away from the valve body 34 against the resistance of a compression coil spring 64 which bears against the opposite end of the cylinder 60, as will be readily understood upon reference to Figure 3. The piston 62 includes a conductive disc 62' which is in electrical contact with the cylinder 60. Carried by the piston 62 in contact with the disc 62' is a contact arm 66. Another contact arm 68 is carried by the end of the cylinder 60 remote from the valve body 34 in electrically isolated relation to the cylinder. The cylinder 60 is grounded as at 70. Connected to the contact arm 68 is a conductor 72. Contact points 74 and 74' are carried by the arms 66 and 68, respectively, and are normally in contact with each other. As the piston 62 is moved against the resistance of the spring 64 by oil pressure, the contact point 74' is moved out of contact with the contact point 74. The conductor 72 is connected to a conductor 76 which is connected to one terminal of the coil 52, and the remaining terminal of the coil 52 is connected by a conductor 78 to the ungrounded side of the ignition system battery 80, whose remaining side is grounded. The usual ignition switch 82 is connected in the conductor 78.

In use, it will be obvious that when the ignition switch 82 is closed, the electrical energy will not only be supplied to the ignition system of the engine but will also flow from the power source 80 through the coil 52, conductors 76 and 72, contacts 74 and 74', contact arms 68 and 66 to ground 70 to energize the coil 52 and elevate the armature 50 to cause the pin or stem 48 to lift the valve 40 from its seat 38 to permit lubricant contained within the chamber 26 of the accumulator 20 to flow outwardly therefrom through the valve body 34 and conduit 16 to the pressure pipe 12 of the lubricating system so as to thoroughly lubricate the parts of the engine while ignition is taking place within the cylinders thereof. As soon as the engine starts, pressure starts to build up within the lubricating system so that fluid under pressure is introduced into the passage 36 through the conduit 16 and the fluid will flow around the valve 40 into the accumulator 20 to build up the pressure within the chamber 26 thereof ready for a repeat operation. When the pressure of the lubricating fluid within the system attains a predetermined value, the piston 62 will move against the effort of the spring 64 to separate the contacts 74 and 74' and discontinue the energy through the coil 52 to permit the plunger 48 to drop away from the ball 40 so that the latter may seat on the seat 38 under the influence of the spring 42. Thus the normal operation of the lubricating system is restored automatically, while at the same time automatically effecting the initial lubrication of the parts.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In preliminary lubricating means for an engine having an ignition system and a source of lubricant under pressure, a lubricant reservoir, a lubricant reservoir tension means associated with said reservoir for resiliently resisting introduction into the reservoir of more than a predetermined amount of lubricant present in the reservoir, a cage fixed to and depending from said reservoir and in communication therewith, a valve body depending from the lower end of said cage and having a bore communicating with said cage, said valve body having a valve seat on the upper end, a normally closed spring loaded check valve engaging said seat and movable in said cage for resiliently resisting movement of lubricant into said reservoir, an elongated recess in said valve body at and opening into the lower end of said bore, an armature positioned within the recess and movable within said recess from a depressed position to an elevated position, a stem in said bore and carried by said armature, said stem having an upper end arranged to engage and open said check valve in the elevated position of the armature and to be disengaged from the check valve in the depressed position of said armature, an electromagnetic coil surrounding the portion of said valve body adjacent said recess, a passage traversing one side of said valve body and entering said bore and arranged for connection to the lubricant source, a conduit traversing the opposite side of said valve body and entering said bore, a pressure operated switch in effective communication with said conduit and responsive to operating engine lubricant pressure in said conduit to open said switch, and, means including a battery and an ignition switch in series with said coil and said pressure operated switch, whereby closing of said ignition switch energizes said coil to elevate said armature and open said check valve.

2. A preliminary lubricating means for an engine having an ignition system and a source of lubricant under pressure, a lubricant reservoir, a lubricant reservoir tension means associated with said reservoir for resiliently resisting introduction into the reservoir of more than a predetermined amount of lubricant present in the reservoir, a cage fixed to and depending from said reservoir and in communication therewith, a valve body depending from the lower end of said cage and having a bore communicating with said cage, said valve body having a valve seat on the upper end, a normally closed spring loaded check valve engaging said seat and movable in said cage for resiliently resisting movement of lubricant into said reservoir, an elongated recess in said valve body at and opening into the lower end of said bore, an armature positioned in said recess and movable within said recess from a depressed position to an elevated position, a stem in said bore and carried by said armature, said stem having an upper end arranged to engage and open said check valve in the elevated position of the armature and to be disengaged from the check valve in the depressed position of said armature, an electromagnetic coil surrounding the portion of said valve body adjacent said recess, a passage traversing one side of said valve body and entering said bore and arranged for connection to the lubricant source, a conduit traversing the opposite side of the valve body and entering said bore, a pressure operated switch in effective communication with said conduit and responsive to operating engine lubricant pressure in said conduit to open said switch, and, means including a battery and an ignition switch in series with said coil and said pressure operated switch, whereby closing of said ignition switch energizes said coil to elevate said armature and open said check valve, said pressure operated switch being mounted on said valve body.

References Cited in the file of this patent

UNITED STATES PATENTS

| | | |
|---|---|---|
| 2,110,662 | Fisher | Mar. 8, 1938 |
| 2,273,888 | Paulsen | Feb. 24, 1942 |